(12) United States Patent
Vasudev et al.

(10) Patent No.: US 7,016,307 B2
(45) Date of Patent: Mar. 21, 2006

(54) METHOD AND SYSTEM FOR FINDING RELATED NODES IN A SOCIAL NETWORK

(75) Inventors: Varun Vasudev, Bangalore (IN); Bipin Suresh, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 50 days.

(21) Appl. No.: 10/797,966

(22) Filed: Mar. 11, 2004

(65) Prior Publication Data
US 2005/0201290 A1 Sep. 15, 2005

(51) Int. Cl.
H04L 12/26 (2006.01)
H04L 12/28 (2006.01)
G06F 15/16 (2006.01)

(52) U.S. Cl. .............. 370/238; 370/254; 709/220; 709/241

(58) Field of Classification Search ........... 370/229, 370/235, 237, 238, 254, 255, 389, 400; 709/220, 709/223, 224, 238, 241
See application file for complete search history.

(56) References Cited

U.S. PATENT DOCUMENTS

| | | | |
|---|---|---|---|
| 6,704,320 B1 * | 3/2004 | Narvaez et al. ............ 370/408 |
| 2004/0122855 A1 * | 6/2004 | Ruvolo et al. ........... 707/104.1 |
| 2004/0148275 A1 * | 7/2004 | Achlioptas .................. 707/3 |
| 2004/0215793 A1 * | 10/2004 | Ryan et al. ................. 709/229 |
| 2004/0218536 A1 * | 11/2004 | Yasukawa et al. .......... 370/238 |
| 2005/0080924 A1 * | 4/2005 | Shang et al. .............. 709/239 |
| 2005/0083858 A1 * | 4/2005 | Loa et al. .................. 370/254 |

OTHER PUBLICATIONS

Caldwell, Chris, 1995, "Graph Theory Glossary." Available at: http://www.utm.edu/departments/math/graph/glossary.html (Nov. 14, 2003, pp 1-4).
Rodrigue, Dr. Jean-Paul, "Graph Theory: Definition and Properties." Available at: http://people.hofstra.edu/geotrans/eng/ch2en/meth2en/ch2m1en.html (Nov. 14, 2003, pp. 1-8).

* cited by examiner

Primary Examiner—Alpus H. Hsu
(74) Attorney, Agent, or Firm—John W. Branch; Darby & Darby PC

(57) ABSTRACT

A process for reducing the resources employed in real time to communicate a message between related nodes that are separated by multiple degrees of separation in a social network. At least a portion of the shortest path for the multiple degrees of separation between at least two related nodes in a social network is determined out of band prior to the initiation of a process to communicate between the related nodes. By pre-processing at least a portion of the degrees of separation for the shortest path between the nodes, the actual resources employed in real time to calculate the entire shortest path can be reduced. Typically, approximately fifty percent or more of the shortest paths for the degrees of separation between related nodes in the social network are pre-processed. Since the amount of resources for determining the shortest path for each degree of separation can exponentially increase with each degree, the pre-processing of a portion of the degrees of separation along a shortest path can significantly reduce the resources required in real time to complete the determination of the shortest path. Also, if a common intermediate node is identified in the pre-processing of the shortest paths for two nodes in the social network, the intermediate shortest paths can be stored for reuse as a complete shortest path between these two nodes.

42 Claims, 5 Drawing Sheets

METHOD AND SYSTEM FOR FINDING RELATED NODES IN A SOCIAL NETWORK

FIELD OF THE INVENTION

The present invention is generally directed to social networks, and more particularly to efficiently employing resources to finding a node in a large social network.

BACKGROUND OF THE INVENTION

Social networks are often used to represent sets of nodes with varying degrees of separation. These nodes are typically arranged with directed edges that establish connections between the nodes. The nodes can represent persons, locations, entities, information, and the like. In the past, social networks have contained relatively few nodes. However, with the advent of online communities, relatively immense social networks with tens of millions of nodes have developed. Also, since nodes in social networks are connected by varying degrees of separation, it has become increasingly difficult to determine the shortest path for communication (if at all) between nodes that are members of these relatively immense social networks.

DETAILED DESCRIPTION OF THE INVENTION

Figure 1:
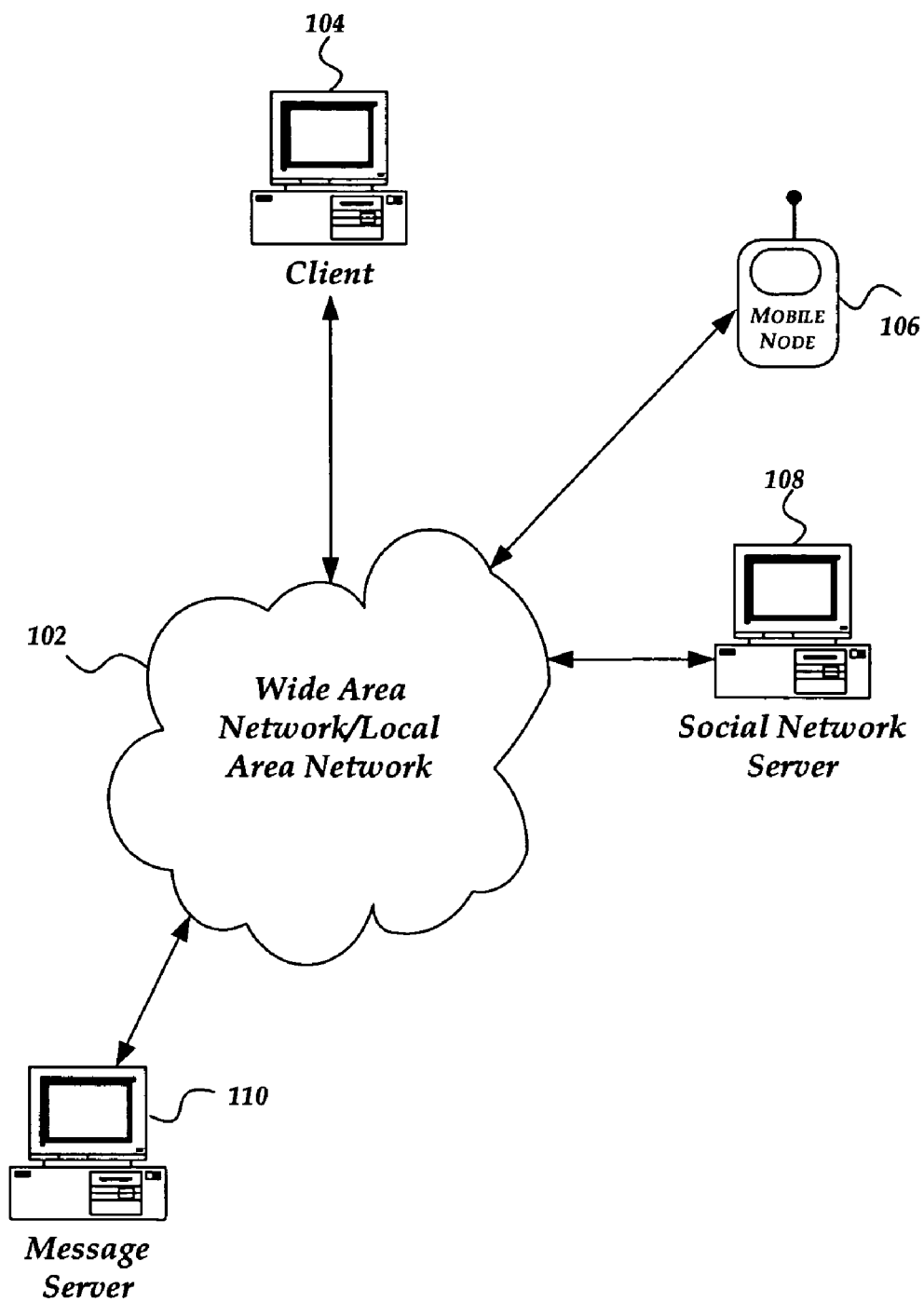
FIG. 1 illustrates a block diagram of an exemplary operating environment.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

The terms "comprising," "including," "containing," "having," and "characterized by," refers to an open-ended or inclusive transitional construct and does not exclude additional, unrecited elements, or method steps. For example, a combination that comprises A and B elements, also reads on a combination of A, B, and C elements.

The meaning of "a," "an," and "the" include plural references. The meaning of "in" includes "in" and "on." Additionally, a reference to the singular includes a reference to the plural unless otherwise stated or is inconsistent with the disclosure herein.

The term "or" is an inclusive "or" operator, and includes the term "and/or," unless the context clearly dictates otherwise.

The phrase "in one embodiment," as used herein does not necessarily refer to the same embodiment, although it may.

The term "based on" is not exclusive and provides for being based on additional factors not described, unless the context clearly dictates otherwise.

The term "flow" includes a flow of packets through a network. The term "connection" refers to a flow or flows of messages that typically share a common source and destination.

Briefly stated, the invention is directed to reducing the resources employed in real time to locate a related node that is separated by no more than a predetermined maximum degree of separation in a social network. At least a portion of the shortest path between the two nodes is determined out of band and prior to the initiation of a process by one node to communicate with the other node. By pre-processing a portion of the shortest path between two nodes, the actual resources employed in real time to subsequently calculate the entire shortest path can be reduced.

In one embodiment, pre-processing is performed for a portion of the shortest path that is no longer than a maximum degree of separation (N) divided by some integer that is less than the maximum degree (N/I). In one embodiment, this integer is equal to two so that the pre-processing is provided for a portion of the shortest path that can be equivalent to up to one half of the maximum degree of separation allowed for determining the shortest path between two nodes.

In another embodiment, if a common intermediate node is identified in the pre-processing of the shortest paths for two nodes in the social network, the intermediate shortest paths can be stored for reuse as a complete shortest path between these two nodes.

In one embodiment, the pre-processing of the shortest paths between two nodes could be determined for the communication of a message to one node and/or the broadcast of a message to a plurality of nodes, including but not limited to, email, Short Messaging S, MultiMedia Service (MMS), Instant Messaging (IM), and the like. In another embodiment, the Illustrative Operating Environment FIG. 1 shows components of an exemplary environment in which the invention may be practiced. Not all the components may be required to practice the invention, and variations in the arrangement and type of the components may be made without departing from the spirit or scope of the invention.

In FIG. 1, one or more local area networks ("LANs") and/or wide area networks ("WAN") are included in a network 102, such as the Internet, that enables communication between various users, devices, servers, clients, processes, and the like. As shown, client 104, mobile node 106, mail server 110 and social network server 108, are shown employing network 102 to communicate with each other, and the like. Mobile node 106 can couple to network 102 using a wireless communications medium. The mobile node can include a mobile telephone, smart phone, pager, walkie talkie, radio frequency (RF) device, infrared (IR) device, WI-FL device, and integrated devices combining one or more of the preceding devices, and the like.

Although not shown, the LANs and WANs of network 102 are typically interconnected by routers and/or switches. Also, communication links within the LANs and WANS can include twisted pair, fiber optics, or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links, and the like. Furthermore, the number of WANs, and LANs in FIG. 1 may be increased or decreased arbitrarily without departing from the spirit or scope of this invention.

The media used to transmit information in communication links as described above illustrates one type of computer-readable media, namely communication media. Generally, computer-readable media includes any media that can be accessed by a computing device. Computer-readable media may include computer storage media, communication media, or any combination thereof.

Additionally, communication media typically embodies computer-readable instructions, data structures, program modules, or other data in a modulated data signal such as a carrier wave or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Mail server 110 and social network server 108 includes, among other components, a central processing unit (processor), a memory for storing instructions, and a network interface unit connected via a bus. The network interface unit includes the necessary circuitry for connecting mail server 110 and social network server 108 to network 102, and is constructed for use with various communication protocols including the TCP/IP and UDP/IP protocols. The network interface unit may include or interface with circuitry and components for communicating information, such as graphical displays, advertiser data, and the like over a wired and/or wireless communications medium. Network interface unit is sometimes referred to as a transceiver.

Process Flow Charts

Figure 2:
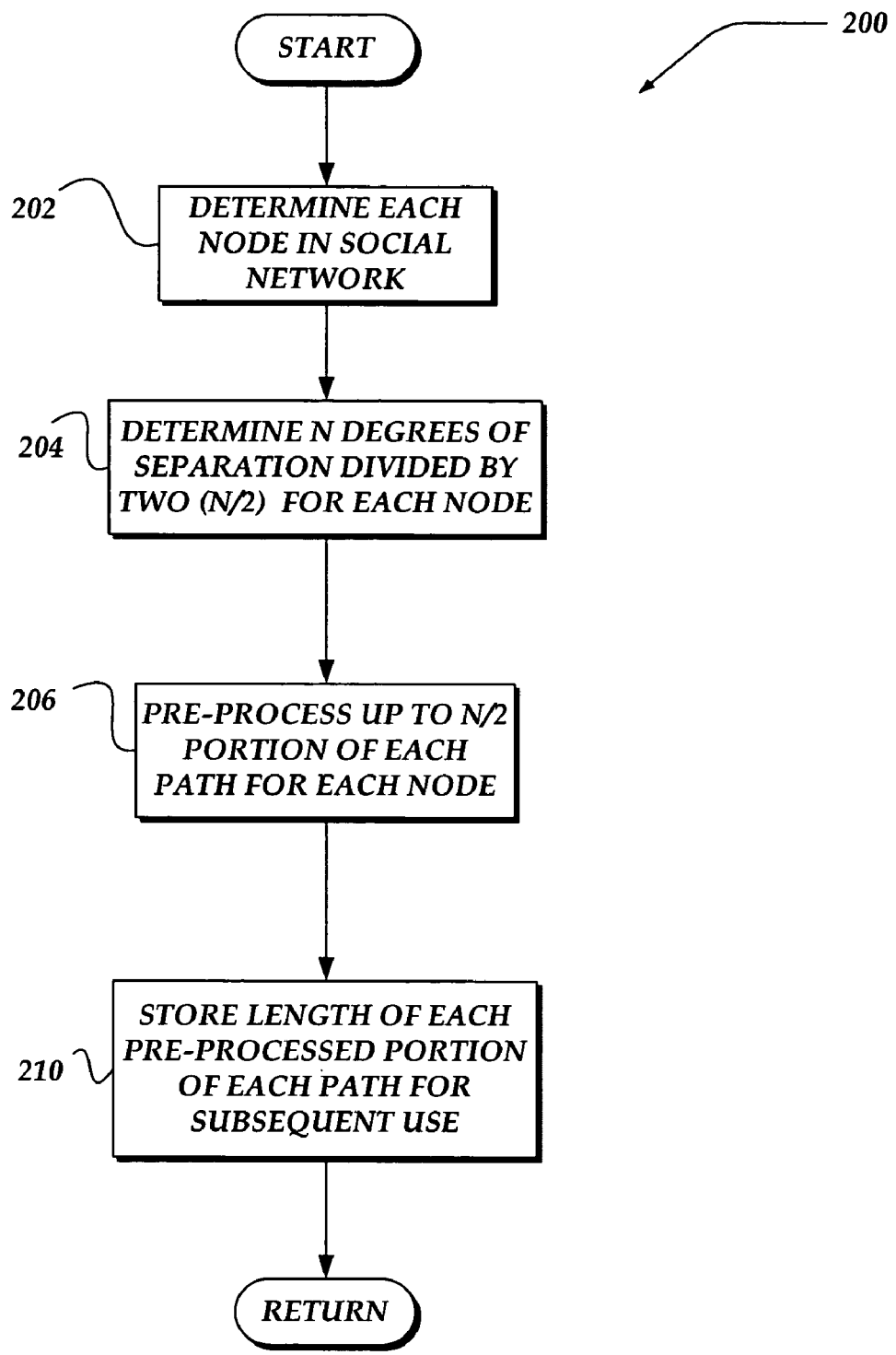
FIG. 2 shows a flow diagram for pre-processing at portion of the shortest paths between nodes in a social network.

FIG. 2 illustrates an overview 200 of a flow chart for pre-processing the degrees of separation for paths between a node and related nodes in a social network where the pre-processing is limited to those related nodes that are no more than a predetermined fraction of the maximum degrees of separation between any two nodes in the social network. Nodes in the social network can include, but are not limited to, a user, a friend, a relative, a classmate, a location, a resource, a contact, a domain, a message address, and a member.

Moving from a start block, a process advances to block 202 where a determination is made to identify each node in a social network. Flowing to block 204, another determination is made as to the maximum degrees of separation between any two nodes in the social network. Also, another determination is made as to the value of a limit that is less than the maximum degree of separation, e.g., the determination of the equation L=N/K, where N is the maximum degree of separation, K is an integer less than N, and L is the limit. For the exemplary embodiment, K is set equal to 2 so that the limit (L) is one half of the maximum degree of separation. However, for other embodiments, other integer values may be provided such that the limit is relatively equivalent to different fractions of "N", e.g., where L is one eighth, one quarter, one third, four eighths, one half, two thirds, three quarters, or seven eighths of N.

At block 206, another determination is made for pre-processing the paths between each node and each related node where each degree of separation is no greater than the limit. Moving to block 210, for each node, the process stores the determined lengths (degree of separation) of the paths. Next, the process returns to processing other actions.

Figure 3:
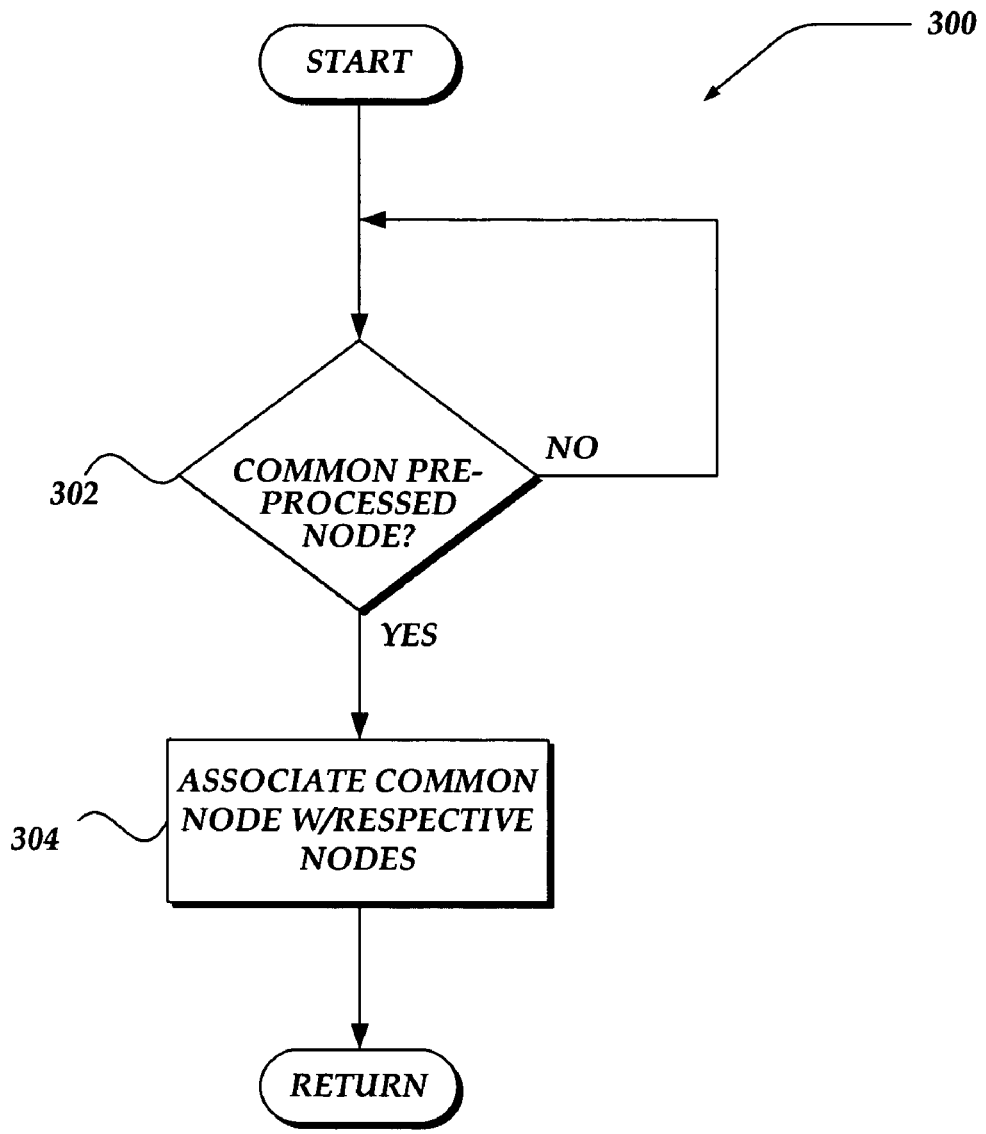
FIG. 3 illustrates a flow diagram for determining pre-processed portions of shortest paths that in combination provide a complete path between nodes in a social network.

FIG. 3 illustrates a flow chart for further optimizing the association of determined degrees of separation along with respective nodes. Moving from a start block, the process steps to determination block 302 where a determination is made as to whether at least one related node for a node is common to another node. If false, the process loops. However, if the determination is true, the process steps to block 304 where each common node association is identified and stored for the node and the other node. Next, the process returns to processing other actions.

Figure 4:
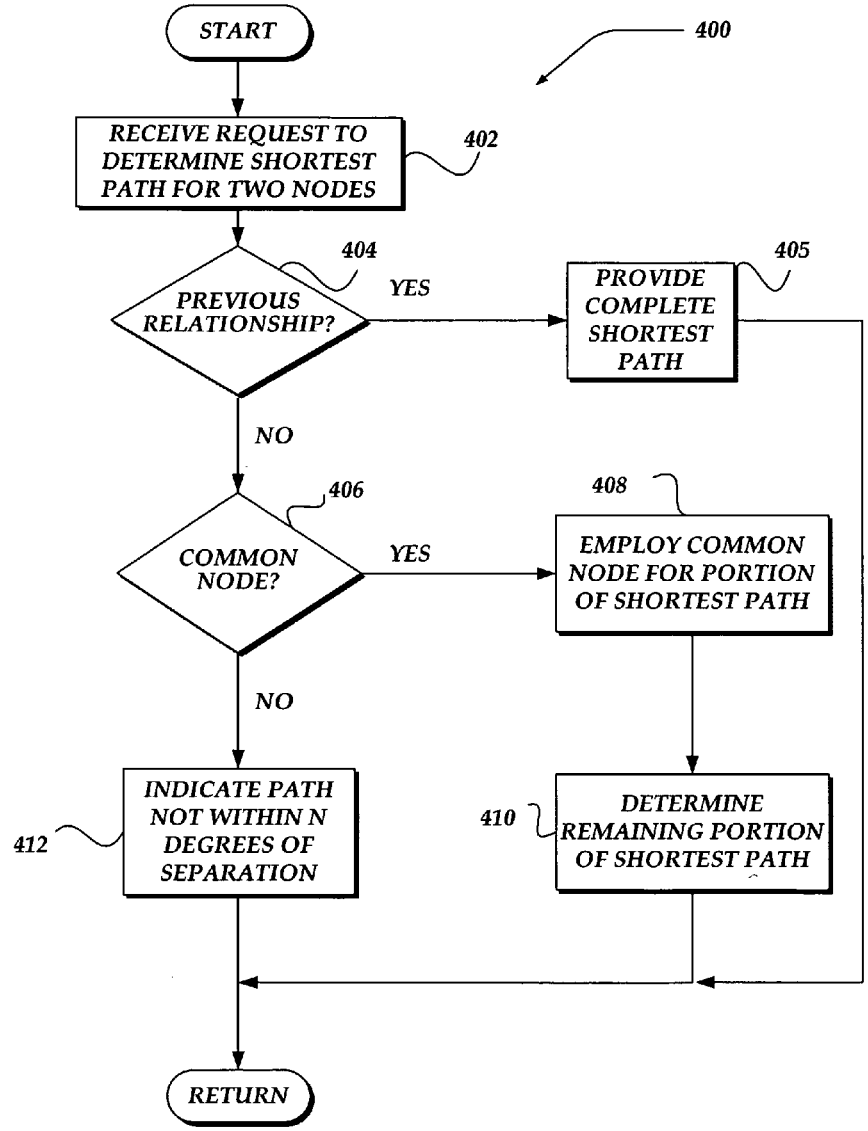
FIG. 4 shows a flow diagram for in response to a request, determining the shortest paths between nodes in a social network.

FIG. 4 illustrates a flow chart for processing a request to find the complete shortest path between two nodes where a length of the shortest path is no more than a maximum degree of separation. Moving from a start block, the process steps to block 402 where the request is received for determining the shortest path between two (pair) of nodes. The process flows to decision block 404 where a determination is made as to whether one of the two nodes was previously identified as a related node to the other during the pre-processing of the paths between each node and related nodes. If true, the process steps to block 405 where the complete shortest path between the two nodes is provided based on the previously pre-processed path. Next, the process returns to performing other actions.

However, if the determination at decision block 404 had been false, the process would have stepped to decision block 406 where a determination would be made as to whether the two nodes have a common related node. If that determination is true, the process moves to a block 408 where the common related node is employed to provide a portion of the shortest path between the two nodes. The process advances to block 410 where the remaining portion to complete the shortest path between the two nodes is determined. The complete shortest path between the two nodes is subsequently provided for further processing by another facility. Next, the process returns to processing other actions. Additionally, the other facility may include, but is not limited to, at least one electronic messaging system such as email, short message service (SMS), multi-media service (MMS), and instant messaging (IM), and the like. Also, the other facility may include other applications that employ the determined shortest path to identify the proximity of physical locations, resources, classmates, friends, members, relatives, contacts, domains, message addresses, and the like.

Alternatively, if the determination at decision block 406 had been false, the process would have advanced to block 412 where it would be indicated that the shortest path between the two nodes could not be provided. In one embodiment, it could also be indicated that the shortest path could not be provided at least because the shortest path (if it exists) between the two nodes would be greater than the provided maximum degree of separation for determining the shortest path. Next, the process returns to processing other actions.

Figure 5:
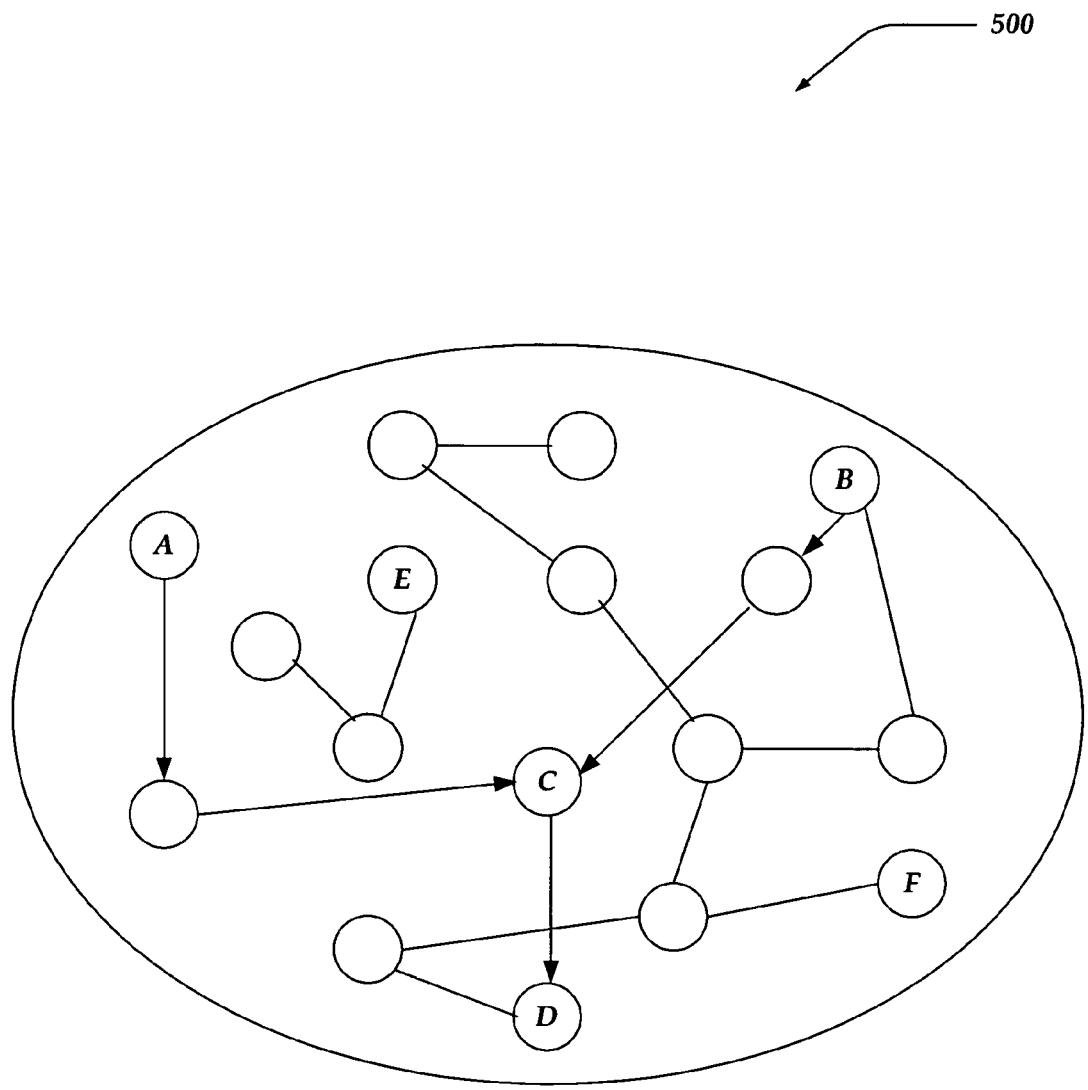
FIG. 5 illustrates a schematic diagram of paths between nodes in a social network in accordance with the present invention.

FIG. 5 illustrates an overview of social network 500 where a plurality of nodes are separated by varying degrees of separation. For example, node A and node B are both separated from node D by three degrees of separation. Also, nodes A and B share a common related node "C". Additionally, node F is separated from node B by four degrees of separation; and node F is also separated from node A by six degrees of separation which is the maximum degrees of separation for any node in this social network. Furthermore, although node E is related to two other nodes, there is no path (shortest or otherwise) between node F and substantially most of the other nodes in this social network, e.g., nodes A, B, C, D, and F are not accessible to node E by a path through other related nodes.

Combinations of the blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Although the invention has been described in terms of communication between servers, client-server, a user and a network device, and the like, the invention is not so limited. For example, the communication may be between virtually any resource, including but not limited to multiple users, multiple servers, and any other network device, without departing from the scope of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems, which perform the specified actions or steps, or combinations of special purpose hardware and computer instructions.

What is claimed as new and desired to be protected by Letters Patent of the United States is:

1. A method for finding related nodes in a network, comprising:
   pre-processing a degree of separation between each node in a plurality of nodes and at least a portion of each related node in the plurality of nodes, wherein the pre-processed degree of separation is less than a maximum degree of separation between a node and at least one related node in the plurality of nodes;
   associating each pre-processed degree of separation with each respective related node for each node in the plurality of nodes;
   receiving a request to determine a shortest path between the node and another node in the plurality of nodes;
   employing the pre-processed degrees of separation associated with respective related nodes to determine if at least a portion of the shortest path between the node and the other node is pre-processed; and
   if a complete shortest path between the node and the other node is determined to be no greater than the maximum degree of separation, providing the complete shortest path between the node and the other node based at least in part on the pre-processed degrees of separation associated with respective related nodes.

2. The method of claim 1, further comprising providing a limit for a number of degrees of separation that are pre-processed between the node and each related node in the plurality of nodes, wherein the limit is a fraction of the maximum degree of separation.

3. The method of claim 2, wherein the fraction of the maximum degree of separation for the limit is at least one of: one eighth, one quarter, one third, four eighths, one half, two thirds, three quarters, seven eighths.

4. The method of claim 1, further comprising if the pre-processed degrees of separation associated with respective nodes are employed to determine less than the complete shortest path, determining a remaining portion of the complete shortest path between the node and the other node.

5. The method of claim 1, wherein the network is at least one of a social network, heterogeneous network and a homogeneous network.

6. The method of claim 1, wherein the plurality of nodes in the network include at least one of a user, a friend, a relative, a classmate, a location, a resource, a contact, a domain, a message address, and a member.

7. The method of claim 1, wherein the pre-processing occurs prior to receiving the request for the path between the node and the other node.

8. The method of claim 1, further comprising if it is determined that the node and the other node are separated by more than the maximum degree of separation, indicating that the node and the other node are unrelated.

9. The method of claim 1, further comprising if it is determined that the other node is related to the node, employing the pre-processed degree of separation to provide the complete shortest path.

10. The method of claim 1, further comprising determining each related node that is common to at least two nodes in the plurality of nodes, wherein the common related node is employed to assist in determining the complete shortest path between the node and the other node.

11. The method of claim 1, wherein the maximum degree of separation is no greater than a largest degree of separation between the node and any another node in the plurality of nodes, and wherein the maximum degree of separation is selectable to be substantially less than the largest degree of separation.

12. A server for finding related nodes in a network, comprising:
   a memory for storing data; and
   a processor that employs the stored data to perform actions, comprising:
   pre-processing a degree of separation between each node in a plurality of nodes and at least a portion of the related nodes in the plurality of nodes, wherein the pre-processed degree of separation is less than a maximum degree of separation between a node and at least one related node in the plurality of nodes;
   associating each pre-processed degree of separation with each respective related node for each node in the plurality of nodes;
   receiving a request to determine a path between the node and another node in the plurality of nodes;
   employing the pre-processed degrees of separation associated with respective related nodes are employed to determine if at least a portion of a shortest path between the node and the other node is pre-processed; and if the shortest path between the node and the other node is determined to be no greater than the maximum degree of separation, providing a complete shortest path between the node and the other node.

13. The server of claim 12, wherein the actions further comprise providing a limit for a number of degrees of separation that are pre-processed between the node and each related node in the plurality of nodes, wherein the limit is a fraction of the maximum degree of separation.

14. The server of claim 13, wherein the fraction of the maximum degree of separation for the limit is at least one of: one eighth, one quarter, one third, four eighths, one half, two thirds, three quarters, seven eighths.

15. The server of claim 12, wherein the actions further comprise if the pre-processed degrees of separation associated with respective nodes are employed to determine less than the complete shortest path, determining a remaining portion of the complete shortest path between the node and the other node.

16. The server of claim 12, wherein the network is at least one of a social network, heterogeneous network and a homogeneous network.

17. The server of claim 12, wherein the plurality of nodes in the network include at least one of a user, a friend, a relative, a classmate, a location, a resource, a contact, a domain, a message address, and a member.

18. The server of claim 12, wherein the pre-processing occurs prior to receiving the request for the path between the node and the other node.

19. The server of claim 12, wherein the actions further comprise if it is determined that the node and the other node are separated by more than the maximum degree of separation, indicating that the node and the other node are unrelated.

20. The server of claim 12, wherein the actions further comprise if it is determined that the other node is related to the node, employing the pre-processed degree of separation to provide the complete shortest path.

21. The server of claim 12, wherein the actions further comprise determining each related node that is common to at least two nodes in the plurality of nodes, wherein the common related node is employed to assist in determining the complete shortest path between the node and the other node.

22. The server of claim 12, wherein the maximum degree of separation is no greater than a largest degree of separation between the node and any another node in the plurality of nodes, and wherein the maximum degree of separation is selectable to be substantially less than the largest degree of separation.

23. A client for finding related nodes in a network, comprising:
a memory for storing data; and
a processor that employs the stored data to perform actions, comprising:
enabling the pre-processing of a degree of separation between each node in a plurality of nodes and at least a portion of the related nodes in the plurality of nodes, wherein the pre-processed degree of separation is less than a maximum degree of separation between a node and at least one related node in the plurality of nodes;
enabling the associating of each pre-processed degree of separation with each respective related node for each node in the plurality of nodes;
enabling the receiving of a request to determine a path between the node and another node in the plurality of nodes;
enabling the pre-processed degrees of separation associated with respective related nodes to be employed to determine if at least a portion of a shortest path between the node and the other node is pre-processed; and
if the shortest path between the node and the other node is determined to be no greater than the maximum degree of separation, enabling a complete shortest path between the node and the other node to be provided.

24. The client of claim 23, wherein the actions further comprise providing a limit for a number of degrees of separation that are pre-processed between the node and each related node in the plurality of nodes, wherein the limit is a fraction of the maximum degree of separation.

25. The client of claim 24, wherein the fraction of the maximum degree of separation for the limit is at least one of: one eighth, one quarter, one third, four eighths, one half, two thirds, three quarters, seven eighths.

26. The client of claim 23, wherein the actions further comprise if the pre-processed degrees of separation associated with respective nodes are employed to determine less than the complete shortest path, determining a remaining portion of the complete shortest path between the node and the other node.

27. The client of claim 23, wherein the network is at least one of a social network, heterogeneous network and a homogeneous network.

28. The client of claim 23, wherein the plurality of nodes in the network include at least one of a user, a friend, a relative, a classmate, a location, a resource, a contact, a domain, a message address, and a member.

29. The client of claim 23, wherein the pre-processing occurs prior to receiving the request for the path between the node and the other node.

30. The client of claim 23, wherein the actions further comprise if it is determined that the node and the other node are separated by more than the maximum degree of separation, indicating that the node and the other node are unrelated.

31. The client of claim 23, wherein the actions further comprise if it is determined that the other node is related to the node, employing the pre-processed degree of separation to provide the complete shortest path.

32. The client of claim 23, wherein the actions further comprise determining each related node that is common to at least two nodes in the plurality of nodes, wherein the common related node is employed to assist in determining the complete shortest path between the node and the other node.

33. The client of claim 23, wherein the maximum degree of separation is no greater than a largest degree of separation between the node and any another node in the plurality of nodes, and wherein the maximum degree of separation is selectable to be substantially less than the largest degree of separation.

34. An apparatus for finding nodes in a network, comprising:
a means for pre-processing a degree of separation between each node in a plurality of nodes and at least a portion of the related nodes in the plurality of nodes, wherein the pre-processed degree of separation is less than a maximum degree of separation between a node and at least one related node in the plurality of nodes;
a means for associating each pre-processed degree of separation with each respective related node for each node in the plurality of nodes;

a means for receiving a request to determine a path between the node and another node in the plurality of nodes;

a means for employing the pre-processed degrees of separation associated with respective related nodes are employed to determine if at least a portion of a shortest path between the node and the other node is pre-processed; and a means for providing a complete shortest path between the node and the other node if the complete shortest path between the node and the other node is determined to be no greater than the maximum degree of separation.

35. A processor-readable medium embodying processor-executable data that enables actions for finding related nodes in a network, the actions comprising:

pre-processing a degree of separation between each node in a plurality of nodes in a network and at least a portion of the related nodes in the plurality of nodes, wherein the pre-processed degree of separation is less than a maximum degree of separation between a node and at least one related node in the plurality of nodes;

associating each pre-processed degree of separation with each respective related node for each node in the plurality of nodes;

receiving a request to determine a path between the node and another node in the plurality of nodes;

employing the pre-processed degrees of separation associated with respective related nodes are employed to determine if at least a portion of a shortest path between the node and the other node is pre-processed; and if a complete shortest path between the node and the other node is determined to be no greater than the maximum degree of separation, providing the complete shortest path between the node and the other node.

36. The processor-readable medium of claim 35, wherein the actions further comprise providing a limit for a number of degrees of separation that are pre-processed between the node and each related node in the plurality of nodes, wherein the limit is a fraction of the maximum degree of separation.

37. The processor-readable medium of claim 35, wherein the actions further comprise if the pre-processed degrees of separation associated with respective nodes are employed to determine less than the complete shortest path, determining a remaining portion of the complete shortest path between the node and the other node.

38. The processor-readable medium of claim 35, wherein the network is at least one of a social network, heterogeneous network and a homogeneous network.

39. The processor-readable medium of claim 35, wherein the plurality of nodes in the network include at least one of a user, a friend, a relative, a classmate, a location, a resource, a domain, a contact, a message address, and a member.

40. The processor-readable medium of claim 35, wherein the actions further comprise if it is determined that the node and the other node are separated by more than the maximum degree of separation, indicating that the node and the other node are unrelated.

41. The processor-readable medium of claim 35, wherein the actions further comprise if it is determined that the other node is related to the node, employing the pre-processed degree of separation to provide the complete shortest path.

42. The processor-readable medium of claim 35, wherein the maximum degree of separation is no greater than a largest degree of separation between the node and any another node in the plurality of nodes, and wherein the maximum degree of separation is selectable to be substantially less than the largest degree of separation.

* * * * *

UNITED STATES PATENT AND TRADEMARK OFFICE
CERTIFICATE OF CORRECTION

| | | |
|---|---|---|
| PATENT NO. | : 7,016,307 B2 | Page 1 of 1 |
| APPLICATION NO. | : 10/797966 | |
| DATED | : March 21, 2006 | |
| INVENTOR(S) | : Varun Vasudev et al. | |

It is certified that error appears in the above-identified patent and that said Letters Patent is hereby corrected as shown below:

Title page Col. 2 (Other Publications), Line 3, Delete "pp" and insert -- pp. --.

Column 2, Line 46-47 Delete "Short Messaging S, MultiMedia Service (MMS),"

and insert -- Short Messaging Service (SMS), Multi-Media Sevice (MMS),--.

Column 3, Line 1, Delete "WI-FL" and insert -- WI-FI --.

Signed and Sealed this

Eighth Day of August, 2006

JON W. DUDAS
*Director of the United States Patent and Trademark Office*